US010399314B2

(12) United States Patent
Aimu

(10) Patent No.: US 10,399,314 B2
(45) Date of Patent: Sep. 3, 2019

(54) LAMINATION DEVICE

(71) Applicant: TOYOTA JIDOSHA KABUSHIKI KAISHA, Toyota-shi, Aichi-ken (JP)

(72) Inventor: Masanori Aimu, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/911,886

(22) Filed: Mar. 5, 2018

(65) Prior Publication Data
US 2018/0250922 A1 Sep. 6, 2018

(30) Foreign Application Priority Data

Mar. 6, 2017 (JP) .................................. 2017-041462

(51) Int. Cl.
| B32B 37/00 | (2006.01) |
| B32B 37/10 | (2006.01) |
| B32B 37/14 | (2006.01) |
| B32B 37/20 | (2006.01) |
| B32B 41/00 | (2006.01) |

(52) U.S. Cl.
CPC ...... *B32B 37/0053* (2013.01); *B32B 37/1036* (2013.01); *B32B 37/144* (2013.01); *B32B 37/203* (2013.01); *B32B 41/00* (2013.01); *B32B 2250/02* (2013.01); *B32B 2305/026* (2013.01); *B32B 2307/20* (2013.01); *B32B 2309/16* (2013.01); *B32B 2309/70* (2013.01); *B32B 2457/18* (2013.01)

(58) Field of Classification Search
CPC ... B32B 37/0053; B32B 41/00; B32B 37/144; B32B 37/203; B32B 37/1036
See application file for complete search history.

(56) References Cited

U.S. PATENT DOCUMENTS

| 2008/0086871 | A1* | 4/2008 | Rohland | .................. B32B 37/22 |
| | | | | 29/623.1 |
| 2015/0263370 | A1* | 9/2015 | Takeshita | ............ H01M 8/1093 |
| | | | | 429/494 |
| 2017/0033384 | A1* | 2/2017 | Cho | ...................... B32B 37/025 |

FOREIGN PATENT DOCUMENTS

| JP | 2015-024586 | 2/2015 |
| JP | 2016-219099 | 12/2016 |

\* cited by examiner

*Primary Examiner* — Stewart A Fraser
(74) *Attorney, Agent, or Firm* — Finnegan, Henderson, Farabow, Garrett & Dunner, LLP

(57) ABSTRACT

Provided is a lamination device that laminates an electrolyte film and a porous film. The lamination device includes a support portion configured to support a porous film roll, in which the porous film is wound, such that the porous film roll is able to revolve, an unwinding portion configured to support an electrolyte film roll, in which the electrolyte film is wound, and unwind the electrolyte film from the electrolyte film roll, a conveying portion configured to convey the unwound electrolyte film, and a control portion configured to control the support portion, the unwinding portion, and the conveying portion. The control portion is configured to control the support portion such that the conveyed electrolyte film and the porous film roll are brought closer to one another and an outer peripheral surface of the porous film roll is pressed against one of surfaces of the electrolyte film.

9 Claims, 3 Drawing Sheets

LAMINATION DEVICE

INCORPORATION BY REFERENCE

The disclosure of Japanese Patent Application No. 2017-041462 filed on Mar. 6, 2017 including the specification, drawings and abstract is incorporated herein by reference in its entirety.

BACKGROUND

1. Technical Field

The disclosure relates to a lamination device that laminates an electrolyte film and a porous film.

2. Description of Related Art

A reinforced electrolyte film used for a fuel cell is a film made by impregnating a porous film, which is a reinforcing film, with an electrolyte film. In manufacturing this type of reinforced electrolyte film, a porous film and an electrolyte film are laminated. As such a lamination device that laminates two film-shaped members, proposed is one that laminates two film-shaped members by sandwiching those members between a pair of rollers (Japanese Patent Application Publication No. 2015-24586 (JP 2015-24586A)).

SUMMARY

In the lamination device according to JP 2015-24586A, two film-shaped members are sandwiched between a pair of rollers and thus laminated. However, in this kind of lamination device, when a film-shaped member prone to a neck-in phenomenon that causes shrinkage of a width during conveyance is used, its width dimension varies and a yield can be reduced. In order to prevent the neck-in phenomenon, there is a known method in which a film-shaped member is conveyed while its both ends are gripped by a gripping roller for widening (Japanese Patent Application Publication No. 2016-219099 (JP 2016-219099 A)). However, because the gripping roller grips the film-shaped member, this method could cause a reduction of yield, a cost increase for the lamination device, and so on. A technology has been desired, which realizes lamination of an electrolyte film and a porous film while inhibiting the neck-in phenomenon and a reduction of a yield.

It is possible to realize the disclosure as the following aspects.

According to a first aspect of the disclosure, a lamination device is provided. The lamination device laminates an electrolyte film and a porous film, and includes a support portion configured to support a porous film roll, in which the porous film is wound, such that the porous film roll is able to roll, an unwinding portion configured to support an electrolyte film roll, in which the electrolyte film is wound, and unwind the electrolyte film from the electrolyte film roll, a conveying portion configured to convey the unwound electrolyte film, and a control portion configured to control the support portion, the unwinding portion, and the conveying portion. The support portion and the conveying portion are arranged so as to bring the porous film roll and the electrolyte film, which is conveyed by the conveying portion, closer to one another, and the control portion is configured to control the support portion such that the conveyed electrolyte film and the porous film roll are brought closer to one another and an outer peripheral surface of the porous film roll is pressed against one of surfaces of the electrolyte film. With this aspect, after causing the support portion to support the porous film roll, the porous film roll and the electrolyte film are brought closer to one another, thereby laminating the electrolyte film and the porous film. Further, the porous film is a member that is prone to a neck-in phenomenon when unwound alone from a roll, and the porous film in a rolled state (a state of the porous film roll) is directly laminated with the electrolyte film. Therefore, it is possible to laminate the electrolyte film and the porous film while restraining a neck-in phenomenon and a reduction of yield.

In the lamination device according to the foregoing aspect, the support portion may be configured to support the porous film roll such that the porous film roll is able to move in a direction towards to the electrolyte film conveyed by the conveying portion, and the control portion may be configured to control the support portion such that the porous film roll moves closer to the electrolyte film being conveyed, and the outer peripheral surface of the porous film roll is pressed against one of the surfaces of the electrolyte film. With this aspect, it is possible to laminate the electrolyte film and the porous film by moving the support portion that supports the porous film roll. Further, the porous film is a member that is prone to a neck-in phenomenon when unwound alone from a roll, and the porous film in a rolled state (the state of the porous film roll) is directly laminated with the electrolyte film. Therefore, it is possible to laminate the electrolyte film and the porous film while restraining a neck-in phenomenon and a reduction of yield.

In the lamination device according to the foregoing aspect, the support portion may include a rotary power source, and the support portion may be configured to rotate by using power from the rotary power source. According to the lamination device of this aspect, a composite film, in which the electrolyte film and the porous film are laminated, is conveyed more smoothly compared to an aspect where the support portion is not able to rotate.

In the lamination device according to the foregoing aspect, a tension sensor that detects tension applied to the electrolyte film may be provided. Also, the control portion may be configured to control the support portion such that the outer peripheral surface of the porous film roll is pressed against one of the surfaces of the electrolyte film, and may also be configured to cause the unwinding portion to unwind the electrolyte film such that tension of the electrolyte film is maintained at a set tension while the porous film roll is pressed against one of the surfaces of the electrolyte film. According to this aspect, in the state where the porous film roll is pressed against the electrolyte film, tension applied to the electrolyte film is maintained at a set tension. Therefore, it is possible to restrain elongation and breakage of the electrolyte film caused by an increase in tension applied to the electrolyte film as being pressed by the porous film roll.

In the lamination device according to the foregoing aspect, the control portion may be configured to control the support portion such that the outer peripheral surface of the porous film roll is pressed against one of the surfaces of the electrolyte film, and may also be configured to cause the unwinding portion to unwind the electrolyte film such that, when the porous film roll and the electrolyte film come into contact with each other for a first time, mutual contact portions are not misaligned, and also to move the support portion in a direction in which the porous film roll is pressed against the electrolyte film while causing the support portion to rotate, and complete movement of the support portion. According to this aspect, when the electrolyte film and the porous film are laminated, it is possible to restrain elongation and breakage of the electrolyte film caused by an increase in tension applied to the electrolyte film due to the movement of the support portion. At the same time, it is possible to restrain creases and distortion of the porous film, which happen when the electrolyte film laminated with the porous film roll is peeled off from a surface of the porous film roll and slips.

In the lamination device according to the foregoing aspect, the control portion may be configured to control rotation and the movement of the support portion such that a distal end portion of the porous film roll, from which the porous film is unwound, is not included in the mutual contact portions when the porous film roll comes into contact with the electrolyte film for a first time, and, when the movement of the support portion is completed, the distal end portion is included in a range of the outer peripheral surface of the porous film roll, which is pressed against the electrolyte film. According to this aspect, the distal end portion of the porous film roll, from which the porous film is unwound, is laminated with the electrolyte film when the movement of the support portion is completed, and it is possible to unwind the porous film. Therefore, it is possible to improve workability in forming the composite film.

In the lamination device according to the foregoing aspect, the control portion may be configured to control the rotation and the movement of the support portion such that, when the movement of the support portion is completed, the distal end portion is included in a downstream side of a position of a first point of contact between the porous film roll and the electrolyte film in a conveying direction of the electrolyte film within the range of the outer peripheral surface of the porous film roll, which is pressed against the electrolyte film. According to this aspect, it is possible to laminate the distal end portion of the porous film roll, from which the porous film is unwound, with the electrolyte film when the movement of the support portion is completed. Further, the position of the electrolyte film where the distal end portion is laminated is located on the downstream side of a position of a point of contact between the porous film roll and the electrolyte film in the conveying direction. Therefore, it is possible to increase an area of the porous film roll pressed against the electrolyte film, towards the rear side from the distal end portion. As a result, when formation of the composite film begins, it is possible to restrain a defect caused by a failure of lamination of the distal end portion with the electrolyte film.

In the lamination device according to this aspect, the conveying portion may further include a moving conveying portion configured to convey the electrolyte film and to be movable such that the electrolyte film is brought closer to the support portion. Also, the control portion may be configured to move the moving conveying portion in a direction in which the electrolyte film is brought closer to the support portion when causing the support portion to move in a direction towards the electrolyte film. According to this aspect, when the support portion moves in the direction in which the porous film roll is pressed against the electrolyte film, the moving conveying portion is also able to bring the electrolyte film closer to the support portion. Therefore, it is possible to shorten time that is required for pressing the outer peripheral surface of the porous film roll against the electrolyte film for a given amount.

In the lamination device according to the foregoing aspect, a heating portion may be provided, which is able to heat at least a part of a range of the porous film roll pressed against the electrolyte film. According to this aspect, it is possible to laminate the porous film roll and the electrolyte film even more closely by heating.

Aspects of the disclosure are not limited to a lamination device, and the disclosure may also be applied to various aspects such as a lamination method for laminating an electrolyte film and a porous film, a manufacturing method for a fuel cell that includes an electrolyte film and a porous film. Further, the disclosure is not limited to the foregoing aspects, and is of course carried out in various aspects without departing from the gist of the disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
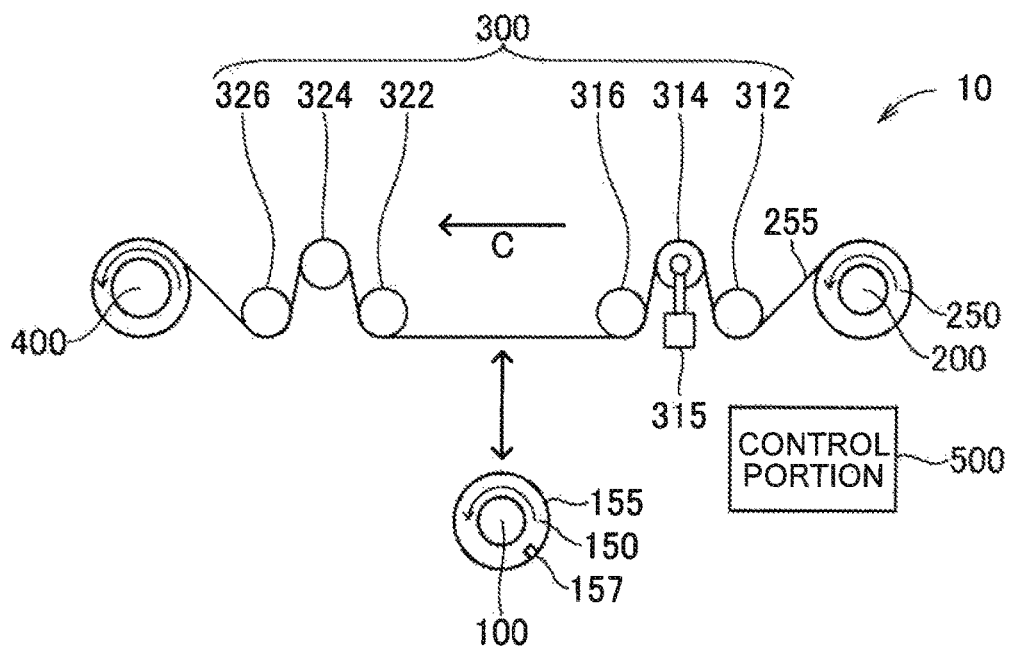
FIG. 1 is an explanatory view of a structure of a lamination device according to a first embodiment.

A. The first embodiment: A1. Structure of a lamination device: FIG. 1 is an explanatory view of a structure of a lamination device 10 according to the first embodiment. The lamination device 10 is a device that forms a composite film by pressing a porous film 155 against an electrolyte film 255 to laminate the electrolyte film 255 and the porous film 155. The composite film is used for manufacturing a reinforced electrolyte film used for a fuel cell. The lamination device 10 includes a support portion 100, an unwinding portion 200, a conveying portion 300, a winding portion 400, and a control portion 500. The lamination device 10 in FIG. 1 is in a state before a later-described lamination process for laminating the electrolyte film 255 and the porous film 155 is carried out.

The support portion 100 supports a porous film roll 150 in which the porous film 155 is wound, such that the porous film roll 150 is able to revolve. The porous film 155 is a stretching porous film made from PTFE (polytetrafluoroethylene). The porous film roll 150 has a distal end portion 157 from which the porous film 155 is unwound. The distal end portion 157 has an adhesive property. The support portion 100 is a driving roller driven by power from a motor (not shown) that serves as a rotary power source, and is able to rotate. Rotation herein means driving by using power. A direction of rotation of the support portion 100 is the counterclockwise direction in a view of the support portion 100 towards a sheet surface in FIG. 1. The support portion 100 is structured so as to be movable to an upper side in the gravity direction and a lower side in the gravity direction in a state of supporting the porous film roll 150. The upper side in the gravity direction means the upper side in FIG. 1. The lower side in the gravity direction means the lower side in FIG. 1. Hereinafter, the left side in FIG. 1 is referred to as the left side, and the right side in FIG. 1 is referred to as the right side.

The unwinding portion 200 supports the electrolyte film roll 250 in which the electrolyte film 255 is wound, and also unwinds the electrolyte film 255 from the electrolyte film roll 250. The electrolyte film 255 has a structure in which the film-like electrolyte resin is arranged on a support film. The unwinding portion 200 is a driving roller. Similarly to the support portion 100, the direction of revolution of the unwinding portion 200 is the counterclockwise direction.

The conveying portion 300 conveys the electrolyte film 255 unwound from the unwinding portion 200. A conveying direction C of the electrolyte film 255 conveyed by the conveying portion 300 means a conveying direction of the electrolyte film 255 in the entire lamination device 10. A shown in FIG. 1, in addition to the direction from the right side to the left side, the conveying direction C locally includes the upper side direction in the gravity direction and the lower side direction in the gravity direction, and a combined direction of them. In the conveying direction C, the right side in FIG. 1 is referred to as an upstream side, and the left side in FIG. 1 is referred to as a downstream side. The conveying portion 300 includes a roller 312, a roller 314, a roller 316, a roller 322, a roller 324, and a roller 326.

The roller 312, the roller 314, the roller 316, the roller 322, the roller 324, and the roller 326 are driven rollers that assist conveyance of the electrolyte film 255 unwound from the unwinding portion 200.

The roller 314 includes a tension sensor 315. The tension sensor 315 detects tension applied to the electrolyte film 255. The tension sensor 315 outputs signals regarding tension applied to the electrolyte film 255 to the control portion 500.

An interval between the roller 316 and the roller 322 is wider than those between the other rollers. Between the roller 316 and the roller 322, the electrolyte film 255 is held in a state of being stretched in a horizontal direction. In the state before the lamination process is carried out, the support portion 100 is arranged between the roller 316 and the roller 322 and also on the lower side in the gravity direction.

The winding portion 400 is able to wind up the electrolyte film 255 transferred from the unwinding portion 200 through the conveying portion 300. The winding portion 400 is a driving roller. Similarly to the unwinding portion 200, the direction of revolution of the winding portion 400 is the counterclockwise direction. Once the electrolyte film 255 and the porous film 155 are laminated as the porous film 155 is pressed against the electrolyte film 255, the winding portion 400 is able to wind up the composite film in which the electrolyte film 255 and the porous film 155 are laminated.

The control portion 500 is a control portion that receives signals output from various sensors provided in the lamination device 10, and controls an operation of each part of the lamination device 10.

A2. Lamination process: The lamination process is explained, in which the porous film 155 is pressed against the electrolyte film 255 so as to laminate the electrolyte filth 255 and the porous film 155. Before the lamination process starts, the porous film roll 150 is installed in the support portion 100 arranged at the position shown in FIG. 1, and the electrolyte film 255 is arranged between the roller 316 and the roller 322 in a state of being stretched in the horizontal direction. Further, before the lamination process starts, since revolution of the unwinding portion 200 and the winding portion 400 is stopped, conveyance of the electrolyte film 255 is also stopped. Once the lamination process starts from this state, the support portion 100 moves to the upper side in the gravity direction, and an outer peripheral surface of the porous film roll 150 is pressed against a surface of the electrolyte film 255, which faces the lower side in the gravity direction, between the roller 316 and the roller 322. At this time, the support portion 100 moves to the upper side in the gravity direction while rotating.

Figure 2:
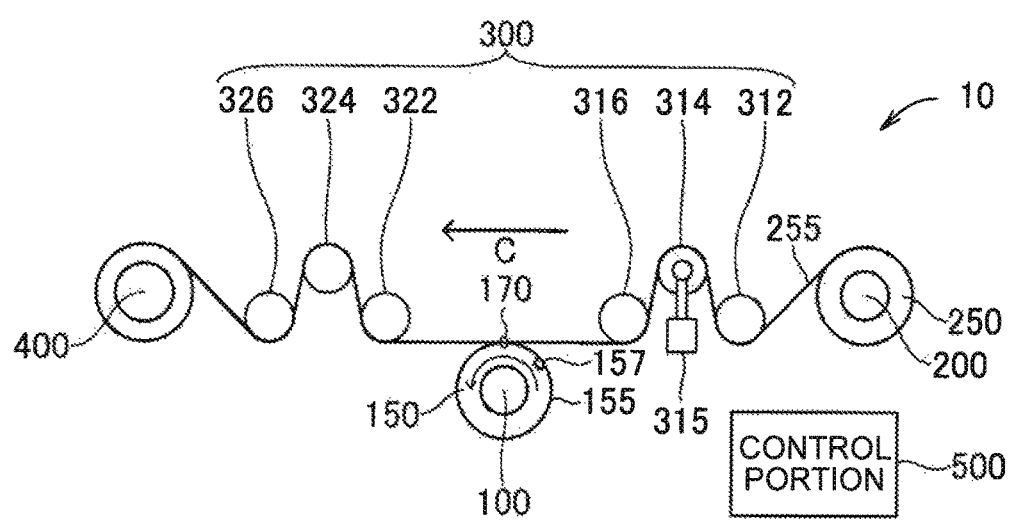
FIG. 2 is an explanatory view of a state where a porous film roll is in contact with an electrolyte film.

FIG. 2 is an explanatory view of a state where the porous film roll 150 is pressed against the electrolyte film 255 as the support portion 100 moves to the upper side in the gravity direction. A point of contact, at which the porous film roll 150 comes into contact with the electrolyte film 255 for the first time, is referred to as a point of contact 170. In a view from the center of the support portion 100, the position of the distal end portion 157 in FIG. 2 has moved counterclockwise in comparison with the position of the distal end portion 157 in FIG. 1 because the support portion 100 has moved to the upper side in the gravity direction while rotating. At this time, in the state where the porous film roll 150 and the electrolyte film 255 come into contact with each other for the first time, the distal end portion 157 is not in contact with the electrolyte film 255. It is not necessary to rotate the support portion 100 until the porous film roll 150 comes into contact with the electrolyte film 255 for the first time, and rotation of the support portion 100 may start at a point in time of the first contact. Also, when the porous film roll 150 and the electrolyte film 255 come into contact with each other for the first time, the distal end portion 157 may be brought into contact with the electrolyte film 255.

Figure 3:
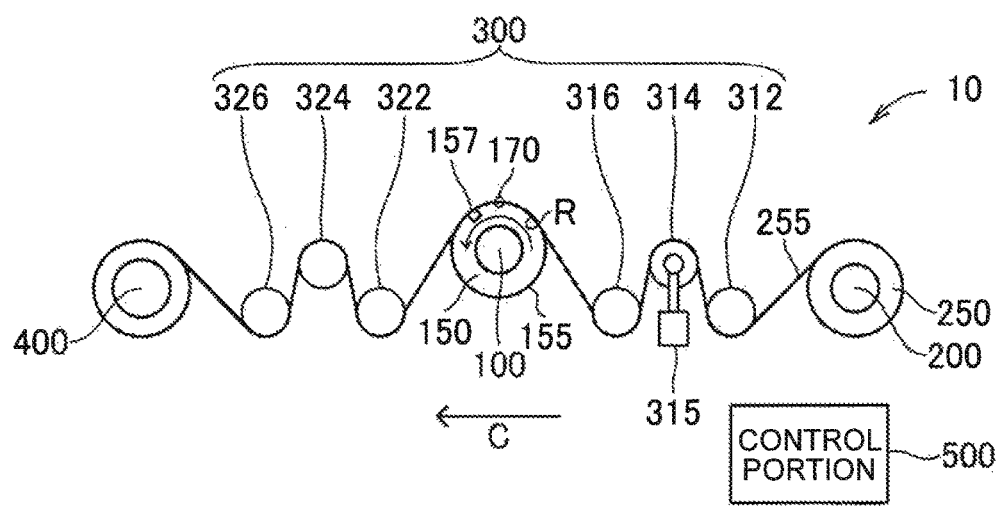
FIG. 3 is an explanatory view of a state where movement of a support portion to an upper side in a gravity direction is completed.

FIG. 3 is an explanatory view of a state where the movement of the support portion 100 to the upper side of the gravity direction is completed. In FIG. 3, the porous film roll 150 is in a state of being pressed against the electrolyte film 255. At this time, the pressed porous film 155 and the electrolyte film 255 are laminated, thus forming the composite film. Once the movement of the support portion 100 to the upper side in the gravity direction is completed, rotation of the support portion 100 is stopped temporarily. Thereafter, the support portion 100, the unwinding portion 200, and the winding portion 400 are driven in conjunction with each other such that their conveyance speed becomes equal, thereby starting conveyance of the composite film. Thus, starting from the distal end portion 157, the porous film 155 laminated with the electrolyte film 255 is unwound sequentially by rotation of the support portion 100 and conveyance by the unwinding portion 200 and the winding portion 400, and then wound up on the winding portion 400 as the composite film.

In the state shown in FIG. 3, in a form where the support portion is not able to rotate (the support portion is a driven roller), the electrolyte film laminated with a surface of the porous film roll is peeled off from the surface of the porous film roll and slips when conveyance of the composite film begins (when the unwinding portion and the winding portion are driven). Due to this, only the electrolyte film can be conveyed without forming the composite film with the porous film, and creases and distortion can also be made in the porous film. Compared to such a form, since the support portion 100 of the lamination device 10 according to this embodiment is able to rotate, it is possible to prevent the electrolyte film 255, laminated with a surface of the porous film roll 150, from peeling off from the surface of the porous film roll 150 when conveyance of the composite film begins. Therefore, it is possible to carry out smooth conveyance of the composite film, in which the electrolyte film 255 and the porous film 155 are laminated, and it is possible to prevent the porous film 155 from having creases and distortion. After conveyance of the composite film starts, if frictional force at laminated portions of the porous film 155 and the electrolyte film 255 is larger than rotary resistance of the support portion 100, it is possible to continue the lamination without causing the support portion 100 to rotate.

After the lamination process starts and until the state shown in FIG. 3 is reached, the control portion 500 carries out the following processing. Because the support portion 100 moves to the upper side in the gravity direction, after the porous film roll 150 and the electrolyte film 255 come into contact with each other and until the movement of the support portion 100 is completed, the electrolyte film 255 between the roller 316 and the roller 322 is stretched to the upper side in the gravity direction due to the movement of the support portion 100, and its length thus becomes larger. Because of this, the control portion 500 causes the unwinding portion 200 to unwind the electrolyte film 255 and also causes the support portion 100 to rotate so as to avoid misalignment of mutual contact portions of the porous film roll 150 and the electrolyte film 255 at the time of the first contact. By doing so, when the electrolyte film 255 and the porous film 155 are laminated, it is possible to restrain elongation and breakage of the electrolyte film 255 caused by an increase in tension applied to the electrolyte film 255 due to the movement of the support portion 100. At the same time, it is possible to restrain creases and distortion from happening in the porous film 155 as the electrolyte film 255 laminated with the porous film roll 150 is peeled off from the surface of the porous film roll 150 and slips.

After start of the lamination process and until the state shown in FIG. 3 is reached, the control portion 500 performs the following processing. Specifically, the control portion 500 carries out control of rotation and movement of the support portion 100 such that the distal end portion 157 is not included in the mutual contact portions at the time of the first contact between the porous film roll 150 and the electrolyte film 255, and that the distal end portion 157 is included in a range R when the movement of the support portion 100 is completed. The range R is a range of the outer peripheral surface of the porous film roll 150, which is pressed against the electrolyte film 255. By doing so, in the state where the movement of the support portion 100 is completed, the distal end portion 157 is laminated with the electrolyte film 255. As a comparative example, a structure is considered where the distal end portion 157 is not laminated with the electrolyte film 255 when the movement of the support portion 100 is completed. In this case, even if the support portion 100, the unwinding portion 200, and the winding portion 400 start driving, the composite film is not formed until the distal end portion 157 comes into contact and is laminated with the electrolyte film 255 by rotation of the support portion 100. Compared to this form, in the lamination device 10 according to this embodiment, it is possible to laminate the distal end portion 157 with the electrolyte film 255 when the movement of the support portion 100 is completed. Thus, it is possible to improve workability in forming the composite film.

Further, after the start of the lamination process and until the state shown in FIG. 3 is reached, the control portion 500 performs the following processing. Specifically, the control portion 500 controls rotation and movement of the support portion 100 such that the distal end portion 157 is included in the downstream side of the point of contact 170 in the conveying direction C within the range R when the movement of the support portion 100 is completed. In this embodiment, rotation and movement of the support portion 100 are controlled such that the distal end portion 157 is arranged at a position within the range R. This position is where a straight line, which extends from the center of the support portion 100 and is inclined towards the downstream side in the conveying direction C by a given angle, intersects a straight line extending from the center of the support portion 100 towards the point of contact 170. It is preferred that the given angle is, for example, 15°. By doing so, it is possible to increase an area of the range R to the clockwise direction from the distal end portion 157, or an area on the upstream side in the conveying direction C. Therefore, when forming of the composite film begins, it is possible to restrain a defect caused by a failure of lamination of the distal end portion 157 with the electrolyte film 255.

According to the embodiment explained above, it is possible to laminate the electrolyte film 255 and the porous film 155 by moving the support portion 100 after causing the support portion 100 to support the porous film roll 150. Further, although the porous film 155 is prone to a neck-in phenomenon when it is unwound alone from the porous film roll 150, the porous film 155 in the rolled state (the state of the porous film roll 150) is directly laminated with the electrolyte film 255. Hence, it is possible to laminate the electrolyte film 255 and the porous film 155 while restraining a neck-in phenomenon and a reduction of yield. Further, since it is possible to avoid complication of the lamination operation, it is also possible to restrain a reduction of yield.

Figure 4:
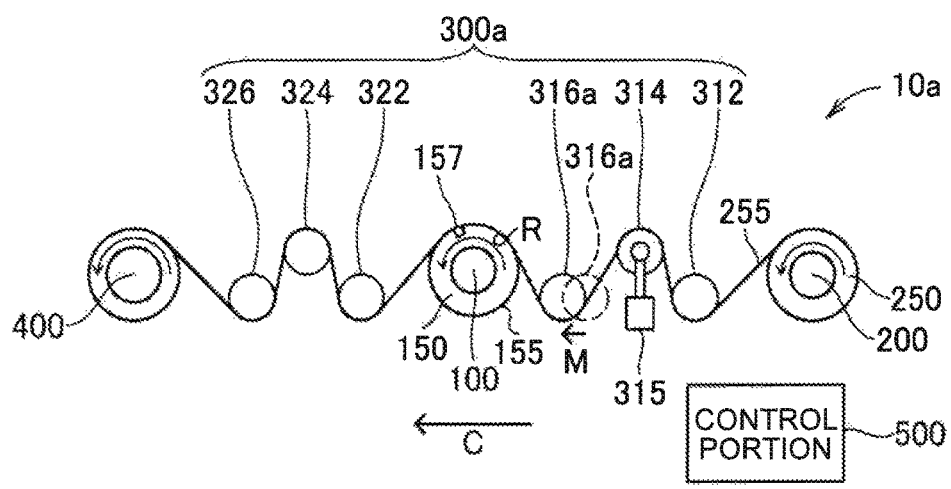
FIG. 4 is an explanatory view of a structure of a lamination device according to a second embodiment.

B. The second embodiment: FIG. 4 is an explanatory view of a structure of a lamination device 10a according to the second embodiment. The lamination device 10a has the same structure as that of the lamination device 10 in the first embodiment except that a different conveying portion 300a from the conveying portion 300 of the lamination device 10 is provided.

The conveying portion 300a is different from the conveying portion 300 of the lamination device 10 according to the first embodiment in that a moving roller 316a is provided as a moving conveying portion instead of the roller 316. The moving roller 316a is structured so as to convey an electrolyte film 255 unwound from an unwinding portion 200 and also be movable to bring the electrolyte film 255 closer to a support portion 100.

When causing the support portion 100 to move in the direction towards the electrolyte film 255 (the upper side in the gravity direction), the control portion 500 moves the moving roller 316a in a direction in which the electrolyte film 255 becomes closer to the support portion 100. In FIG. 4, a broken line shows the moving roller 316a before it moves in a direction M in which the electrolyte film 255 becomes closer to the support portion 100. The position of the moving roller 316a before the movement is the same as the position of the roller 316 of the lamination device 10 according to the first embodiment shown in FIG. 1. By doing so, when the support portion 100 moves in the direction in which a porous film roll 150 is pressed against the electrolyte film 255 (the upper side in the gravity direction), it is also possible for the moving roller 316a to bring the electrolyte film 255 closer to the support portion 100. Therefore, it is possible to shorten a period of time that is required for pressing an outer peripheral surface of the porous film roll 150 against the electrolyte film 255 for a given amount. In other words, in the lamination device 10a, in order to press the outer peripheral surface of the porous film roll 150 against the electrolyte film 255 for a given amount, it is possible to reduce a moving distance of the support portion 100 compared to that of the lamination device 10 according to the first embodiment. The reduction of the moving distance of the support portion 100 can result in a reduction of a size of the entire lamination device 10*a*.

Figure 5:
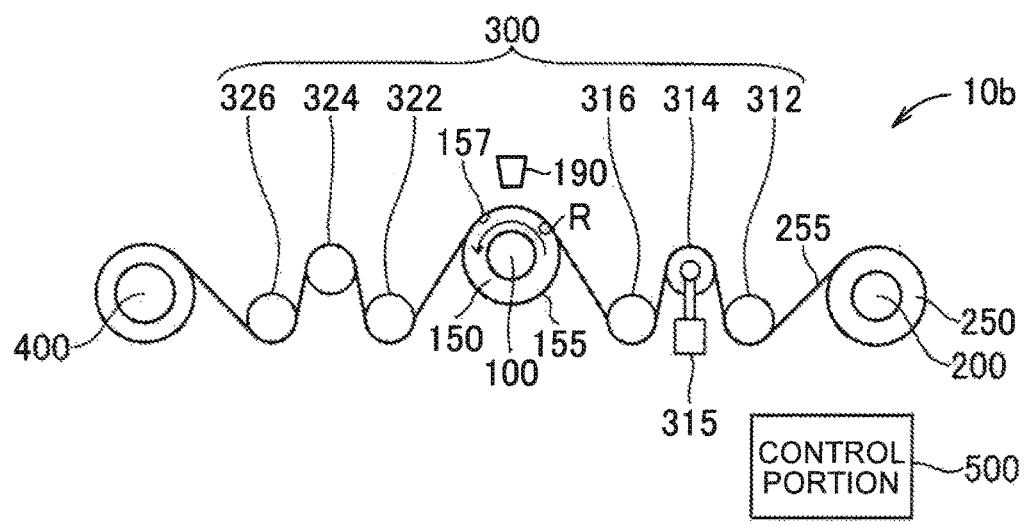
FIG. 5 is an explanatory view of a structure of a lamination device according to a third embodiment.

C. The third embodiment: FIG. 5 is an explanatory view of a structure of a lamination device 10*b* according to the third embodiment. The lamination device 10*b* has the same structure as that of the lamination device 10 according to the first embodiment except that a heating portion 190 is provided.

The heating portion 190 is able to heat a part of a range R. In another embodiment, the heating portion 190 may also be able to heat the entire range R. The heating portion 190 is arranged on the upper side in the gravity direction of an upper area in the gravity direction where a support portion 100 is able to move. The heating portion 190 is a heater that is able to heat a part of the range R when a movement of the support portion 100 is completed.

Due to this, a heated porous film 155 and an electrolyte film 255 are laminated more easily compared to those unheated, and it is thus possible to bring the porous film roll 150 and the electrolyte film 255 into contact more closely with each other for the lamination.

D. Modified embodiments: D1. Modified embodiment 1: A control portion 500 may control a support portion 100 such that an outer peripheral surface of a porous film roll 150 is pressed against one of surfaces of an electrolyte film 255 while conveyance of the electrolyte film 255 is stopped, and, at the same time, the control portion 500 may also control an unwinding portion 200 such that tension of the electrolyte film 255 is maintained at a set tension when the porous film roll 150 is pressed against the electrolyte film 255. A tension sensor 315 detects tension of the electrolyte film 255. The control portion 500 receives a signal indicating detected tension of the electrolyte film 255 from the tension sensor 315. In accordance with the received signal, the control portion 500 causes the unwinding portion 200 to unwind the electrolyte film 255 such that tension of the electrolyte film 255 is maintained at a set tension. By doing so, while the porous film roll 150 is pressed against the electrolyte film 255, tension applied to the electrolyte film 255 is maintained at a set tension. Therefore, it is possible to restrain elongation and breakage of the electrolyte film 255 due to an increase of tension applied to the electrolyte film 255 as being pressed by the porous film roll 150. The set tension may be a fixed value or an arbitrary value within a predetermined range.

Figure 6:
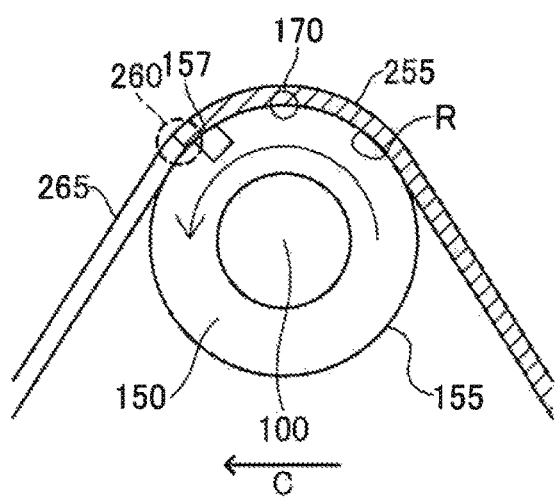
FIG. 6 is an enlarged view of an area around a support portion of a lamination device according to another embodiment.

D2. Modified embodiment 2: In each of the embodiments, a leader 265 may be connected with a distal end of an electrolyte film 255 through a connection portion 260. The leader 265 is a film-shaped member that leads conveyance of the electrolyte film 255. FIG. 6 is an enlarged view of a support portion 100 and its surrounding in a lamination device according to modified embodiment 2. In the modified embodiment 2, the leader 265, which is a film-shaped member, is connected with an end part of the electrolyte film 255 on the downstream side in a conveying direction C through the connection portion 260. A structure of the lamination device according to the modified embodiment 2 is the same as that of the lamination device 10 according to the first embodiment, thus the same constituents are denoted by the same reference numerals and detailed explanation thereof is omitted.

In the lamination device according to modified embodiment 2, when a movement of the support portion 100 is completed, a position of the connection portion 260 is adjusted before a lamination process begins such that the connection portion 260 is arranged at a set position within a part that is in contact with a range R. The position of the connection portion 260 is adjusted as the control portion 500 causes an unwinding portion 200 and a winding portion 400 to convey the electrolyte film 255 and the leader 265 in the conveying direction C. Further, similarly to the lamination device 10 of the first embodiment, the control portion 500 of modified embodiment 2 controls rotation and movement of the support portion 100, thereby adjusting a position of a distal end portion 157 within the range R when the movement of the support portion 100 is completed. Therefore, it is possible to control rotation and movement of the support portion 100 such that the distal end portion 157 is arranged on an upstream side of an end part of the leader 265 on the upstream side. Thus, it is possible to prevent the distal end portion 157 from being laminated with the leader 265. If there is a level difference between the leader 265 and the electrolyte film 255 in the connection portion 260, when the distal end portion 157 is laminated with the leader 265, a gap may be made between the periphery of the connection portion 260 and the porous film 155 due to the level difference in the connection portion 260, and the gap can hinder formation of a composite film. In the lamination device according to modified embodiment 2, it is possible to prevent the distal end portion 157 from being laminated with the leader 265, thereby preventing such a gap from being created.

D3. Modified embodiment 3: In each of the embodiments, the support portion 100 is a driving roller, but the disclosure is not limited to this. For example, the support portion 100 may be a driven roller.

D4. Modified embodiment 4: The distal end portion 157 in each of the embodiments has an adhesive property, but the disclosure is not limited to this. It is not necessary for the distal end portion 157 to have an adhesive property.

D5. Modified embodiment 5: In each of the embodiments, the electrolyte film 255 is conveyed in accordance of drive of the unwinding portion 200 and the winding portion 400. However, the disclosure is not limited to this. For example, in a form where the unwinding portion 200 is a driven roller, and the winding portion 400 is a driving roller, the electrolyte film 255 is conveyed in accordance with drive of the winding portion 400 only.

D6. Modified embodiment 6: In each of the embodiments, the conveying portion 300 includes the plurality of rollers. However, the disclosure is not limited to this. For example, the conveying portion 300 may not be provided with a plurality of rollers, and the winding portion 400 may function as the conveying portion 300. In this case, the electrolyte film 255 unwound from the unwinding portion 200 is wound up directly on the winding portion 400.

D7. Modified embodiment 7: In each of the embodiments, when the lamination process begins, conveyance of the electrolyte film 255 is stopped. However, the disclosure is not limited to this. When the lamination process starts, conveyance of the electrolyte film 255 does not need be stopped.

D8. Modified embodiment 8: In each of the embodiments, the support portion 100 moves to the upper side in the gravity direction such that the outer peripheral surface of the porous film roll 150 is pressed against the electrolyte film 255. However, the disclosure is not limited to this. The moving direction of the support portion 100 is not limited to the gravity direction, and the support portion 100 may be able to move in any direction towards the electrolyte film 255 as long as the outer peripheral surface of the porous film roll 150 is pressed against a surface of the electrolyte film 255.

D9. Modified embodiment 9: In the second embodiment, the moving roller 316a brings the electrolyte film 255 closer to the support portion 100 by moving in the leftward direction as the direction M in which the electrolyte film 255 is brought closer to the support portion 100. However, the disclosure is not limited to this. The moving roller 316a may bring the electrolyte film 255 closer to the support portion 100 by moving in the downward direction in the gravity direction as the direction M in which the electrolyte film 255 is brought closer to the support portion 100.

D10. Modified embodiment 10: In the second embodiment, the support portion 100 brings the electrolyte film 255 closer to the support portion 100 by moving to the upper side in the gravity direction. However, the disclosure is not limited to this. The electrolyte film 255 may be brought closer to the support portion 100 by moving the unwinding portion 200, the conveying portion 300, and the winding portion 400 to the lower side in the gravity direction. Further, the porous film roll 150 and the electrolyte film 255 may be brought into contact with each other as the support portion 100 comes mutually closer to the unwinding portion 200, the conveying portion 300, and the winding portion 400.

D11. Modified embodiment 11: The heating portion 190 according to the third embodiment is a heater. However, the disclosure is not limited to this. For example, the heating portion 190 may be a heating roller. In a case where the heating portion 190 is a heating roller, upon completion of the movement of the support portion 100, the heating roller sandwiches the electrolyte film 255 together with the porous film roll 150, thereby heating a surface where the porous film roll 150 is in contact with the electrolyte film 255.

The disclosure is not limited to the foregoing embodiments, examples, and modified embodiments, and may be carried out in various structures without departing from the gist of the disclosure. For example, the technical features described in the embodiments, examples, and modified embodiments corresponding to the technical features in each aspect stated in the summary section may be replaced and combined as appropriate in order to achieve a part or all of the foregoing effects. Unless explained as essential in this description, the technical features may be deleted as necessary.

What is claimed is:

1. A lamination device that laminates an electrolyte film and a porous film, comprising:
   a support portion configured to support a porous film roll, in which the porous film is wound, such that the porous film roll is able to revolve;
   an unwinding portion configured to support an electrolyte film roll, in which the electrolyte film is wound, and unwind the electrolyte film from the electrolyte film roll;
   a conveying portion configured to convey the unwound electrolyte film; and
   a control portion configured to control the support portion, the unwinding portion, and the conveying portion, wherein
   the support portion and the conveying portion are arranged so as to bring the porous film roll and the electrolyte film, which is conveyed by the conveying portion, closer to one another, and
   the control portion is configured to control the support portion such that the conveyed electrolyte film and the porous film roll are brought closer to one another and an outer peripheral surface of the porous film roll is pressed against one of surfaces of the electrolyte film.

2. The lamination device according to claim 1, wherein
   the support portion is configured to support the porous film roll such that the porous film roll is able to move in a direction closer to the electrolyte film conveyed by the conveying portion, and
   the control portion is configured to control the support portion such that the porous film roll moves closer to the electrolyte film being conveyed, and the outer peripheral surface of the porous film roll is pressed against one of the surfaces of the electrolyte film.

3. The lamination device according to claim 2, wherein
   the conveying portion includes a moving conveying portion configured to convey the electrolyte film and to be movable such that the electrolyte film is brought closer to the support portion, and
   the control portion is configured to move the moving conveying portion in a direction in which the electrolyte film is brought closer to the support portion when causing the support portion to move in a direction towards the electrolyte film.

4. The lamination device according to claim 1, wherein
   the support portion includes a rotary power source, and
   the support portion is configured to rotate using power from the rotary power source.

5. The lamination device according to claim 4, wherein
   the control portion is configured to control the support portion such that the outer peripheral surface of the porous film roll is pressed against one of the surfaces of the electrolyte film, and is also configured to cause the unwinding portion to unwind the electrolyte film such that, when the porous film roll and the electrolyte film come into contact with each other for a first time, mutual contact portions are not displaced, and also to move the support portion in a direction in which the porous film roll is pressed against the electrolyte film, while causing the support portion to rotate, and complete movement of the support portion.

6. The lamination device according to claim 4, wherein
   the control portion is configured to control rotation and movement of the support portion such that a distal end portion of the porous film roll, from which the porous film is unwound, is not included in mutual contact portions when the porous film roll comes into contact with the electrolyte film for a first time, and, when the movement of the support portion is completed, the distal end portion is included in a range of the outer peripheral surface of the porous film roll, which is pressed against the electrolyte film.

7. The lamination device according to claim 6, wherein
   the control portion is configured to control the rotation and the movement of the support portion such that, when the movement of the support portion is completed, the distal end portion is included on a downstream side of a position of a first point of contact between the porous film roll and the electrolyte film in a conveying direction of the electrolyte film within the range of the outer peripheral surface of the porous film roll, which is pressed against the electrolyte film.

8. The lamination device according to claim 1, further comprising
   a tension sensor that detects tension applied to the electrolyte film, wherein
   the control portion is configured to control the support portion such that the outer peripheral surface of the porous film roll is pressed against one of the surfaces of the electrolyte film, and is also configured to cause the unwinding portion to unwind the electrolyte film so as to maintain tension of the electrolyte film at a set tension while the porous film roll is pressed against one of the surfaces of the electrolyte film.

9. The lamination device according to claim 1, further comprising
a heating portion that is able to heat at least a part of a range in which the porous film roll is pressed against the electrolyte film.

* * * * *